(12) United States Patent
Ono et al.

(10) Patent No.: US 7,388,710 B2
(45) Date of Patent: Jun. 17, 2008

(54) OPTICAL PARAMETRIC AMPLIFIER

(75) Inventors: Shunsuke Ono, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 11/477,596

(22) Filed: Jun. 30, 2006

(65) Prior Publication Data

US 2007/0206272 A1    Sep. 6, 2007

(30) Foreign Application Priority Data

Mar. 3, 2006    (JP) .............................. 2006-057610

(51) Int. Cl.
*G02F 1/35* (2006.01)
(52) U.S. Cl. ........................ 359/330; 359/326
(58) Field of Classification Search .......... 359/326–330
See application file for complete search history.

(56) References Cited

U.S. PATENT DOCUMENTS

| 6,424,774 B1 | 7/2002 | Takeda et al. | |
| 2002/0015219 A1* | 2/2002 | Islam | 359/334 |

FOREIGN PATENT DOCUMENTS

| JP | 2000-180907 | 6/2000 |
| JP | 2002-508601 | 3/2002 |
| WO | 99/49580 | 9/1999 |

OTHER PUBLICATIONS

Wong, K.K.Y. et al.: "Continuous-Wave Fiber Optical Parametric Amplifier With 60-dB Gain Using a Novel Two-Segment Design", IEEE Photonics Technology Letters IEEE USA, vol. 15, No. 12, Dec. 2003, pp. 1707-1709.
Provino, L. et al.: "Broadband and flat parametric amplifiers with a multisection dispersion-tailored nonlinear fiber arrangement", Journal of the Optical Society of America B(Optical Physics) Opt. Soc. America USA, vol. 20, No. 7, Jul. 2003, pp. 1532-1537.
Ho, M.C. et al.: "Optical parametric amplification in a high-nonlinearity fiber" Technical Digest. Summaries of Papers Presented at the Conference on Lasers and Electro-Optics. Conference Edition 1998 Technical Digest Series, vol. 6, 1998, Opt. Soc. America Washington, DC, USA, pp. 496-497.
Tang, R. et al.: "Micarostructure-fibre-based optical parametric amplifier with gain slope of ~200 dB/W/km in the telecom range", Electronics Letters, IEE Stevenage, GB, vol. 39, No. 2, Jan. 23, 2003, pp. 195-196.

(Continued)

*Primary Examiner*—Hemang Sanghavi
(74) *Attorney, Agent, or Firm*—Staas & Halsey LLP (57) ABSTRACT

An optical parametric amplifier of the invention comprises a nonlinear amplification section to which a signal light and a pump light are injected via a coupler. The nonlinear amplification section is constructed by connecting in multiple stages a plurality of polarization retaining highly nonlinear optical fibers (HNLFs) having mutually different zero-dispersion wavelengths and dispersion slopes. The zero-dispersion wavelengths of the HNLFs are on the short wavelength side of a pump light wavelength, and are shorter towards the output side HNLF. Furthermore, the arrangement is set such that the dispersion slopes of the HNLFs become steeper towards the output side HNLF. As a result, it is possible to realize an optical parametric amplifier that is high gain and broadband.

9 Claims, 8 Drawing Sheets

FIRST EMBODIMENT OF THE PRESENT INVENTION

OTHER PUBLICATIONS

Hansryd, J. et al.: "Fiber-based Optical Parametric Amplifiers and Their Applications", IEEE Journal of Selected Topics in Quantum Electronics, IEEE Service Center, Piscataway, NJ, US, vol. 8, No. 3, May 2002.

Extended European Search Report mailed on Jun. 27, 2007 issued with respect to the corresponding European Patent Application No. 06013477.2-2205.

* cited by examiner

FIG.1

FIRST EMBODIMENT OF THE PRESENT INVENTION

SECOND EMBODIMENT OF THE PRESENT INVENTION

FIG.7

EXAMPLE OF TYPICAL OPTICAL PARAMETRIC AMPLIFIER

WAVELENGTH DISPERSION CHARACTERISTIC OF NONLINEAR FIBER

FIG.8

OPTICAL PARAMETRIC AMPLIFIER

BACKGROUND OF THE INVENTION

1. Field of the Invention

The present invention relates to an optical parametric amplifier which amplifies a signal light parametrically using nonlinear optical effects. In particular, it relates to a technique designed for high gain and broadband parametric amplification.

2. Description of the Related Art

Currently, optical wavelength division multiplexing (WDM) transmission systems, in which a plurality of signal lights with different wavelengths is multiplexed for transmission by one optical fiber, are coming into practical use. On the other hand, in recent years, attention has been given to optical time division multiplexing (OTDM) transmission systems, in which the bit rate per wavelength is increased and signal lights are multiplexed by time division, due to problems such as the increase in power consumption caused by increasing numbers of wavelengths.

In the OTDM transmission system, since the bit rate is high, an optical switch that controls the on-off switching of a high speed signal light that cannot be processed electrically as it is in the optical state, and an optical sampling system for measuring optical pulses, have become essential basic element technologies.

In recent years, the nonlinearity of optical fibers has been improved compared with the past, and applications are proposed of an ultra high-speed optical switch and an optical sampling technique, in which nonlinear optical effects of optical fibers are used positively. The above-described nonlinear optical effects mean phenomena in which, for example when light with a relatively high power is transmitted through glass, the physical properties of the glass change according to the optical power, and the optical response loses linearity.

Parametric amplification, which is generated in a highly nonlinear fiber having particularly high nonlinearity, is a physical optical phenomenon generated at extremely high speed. Therefore, the speed of response is far higher when compared with a phenomenon in which the refractive index of a medium is changed by thermo- and electro-optical effects, so that it is possible to respond to the high speed optical pulses used in OTDM with no delay. In this manner, the optical parametric amplification technique is expected to be an optical amplification principle with high speed response characteristics, which is essential to constructing future ultra high-speed networks.

For a conventional optical amplifier in which parametric amplification as described above is used, a broadband nonlinear polarized amplifier is proposed for example in Japanese Patent Application National Publication (Laid-Open) No. 2002-50861, in which a combination of cascading Raman amplification, and either one of parametric amplification in an optical fiber or four wave mixing, is used. In the conventional technique, one intermediate order for cascading Raman amplification is arranged such that it is close to the zero-dispersion wavelength of an amplification fiber, and broadband optical amplification is achieved by utilizing the fact that, in the case where the wavelength is longer than the zero-dispersion wavelength, it is phase-matched by parametric amplification, and in the case where it is shorter than the zero-dispersion wavelength, it is phase-matched by four wave mixing.

Furthermore, for another conventional technique in which nonlinear optical effects of optical fibers are utilized, a system is also proposed for example in Japanese Unexamined Patent Publication No. 2000-180807, that performs wavelength conversion of a signal light by four wave mixing by injecting, into a plurality of dispersion-shifted optical fibers each having different zero-dispersion wavelengths and connected in series, a signal light, and a pump light with the same wavelength as one of the different zero-dispersion wavelengths.

Incidentally, as is apparent from the fact that the above-described conventional optical amplifiers realize broadband by combining cascading Raman amplification and parametric amplification or four wave mixing, regarding an optical parametric amplifier that amplifies a signal light parametrically, there is a problem in that it is difficult to realize the desired bandwidth and gain in the case where a signal light is amplified using parametric amplification on its own.

Here is a description of the basic principle of operation of an optical parametric amplifier.

Figure 7:
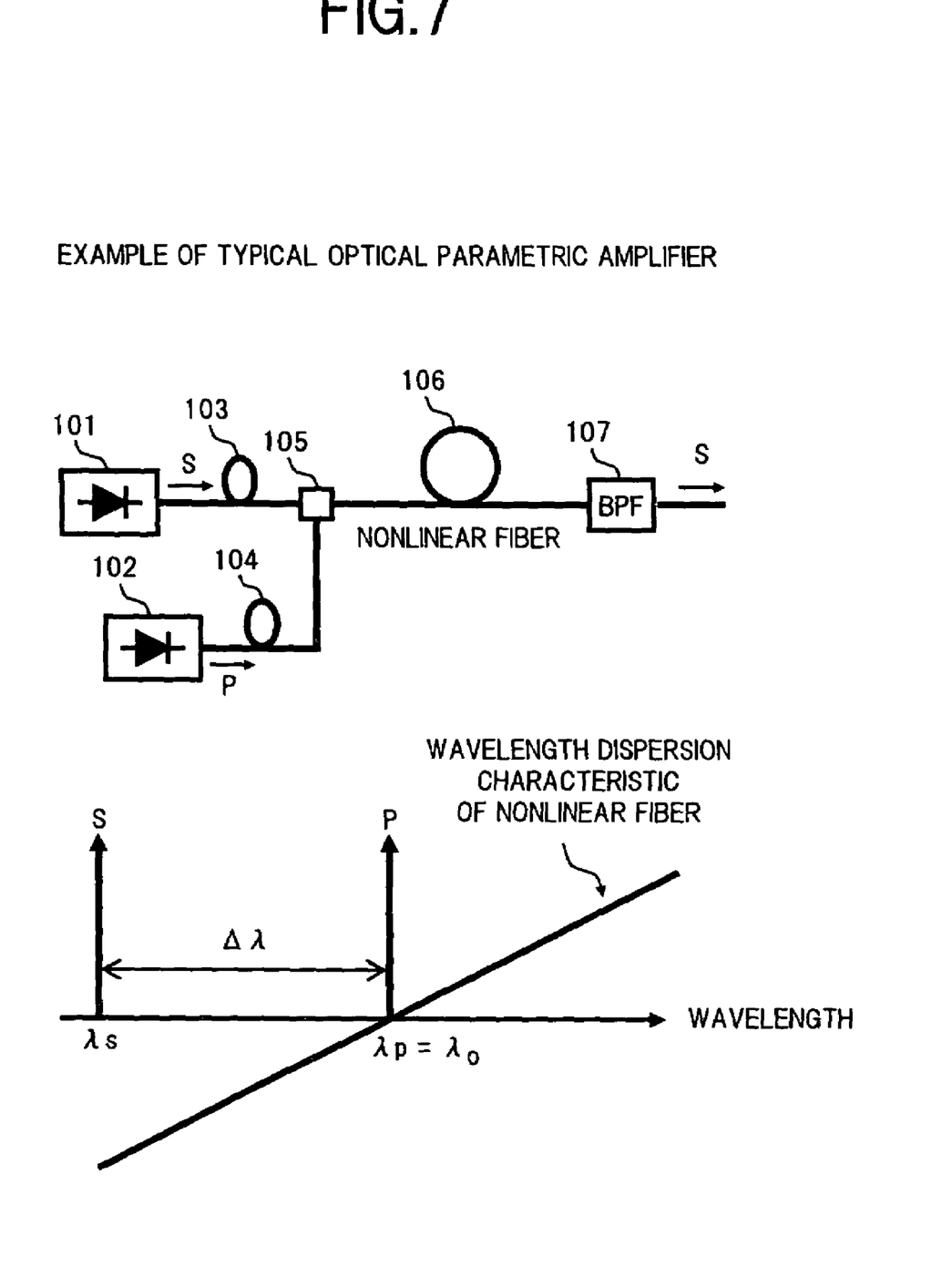
FIG. 7 is a diagram showing a structural example of a typical optical parametric amplifier.

In a typical optical parametric amplifier, for example as shown at the top of FIG. 7, a signal light pulse S with a wavelength $\lambda_s$, injected from a signal light source 101, and a pump light pulse P with a wavelength $\lambda_p$, injected from a pump light source 102, are applied to a nonlinear fiber 106 via polarization controllers 103 and 104, and a coupler 105, and light transmitted through the nonlinear fiber 106 is passed through an optical bandpass filter 107, and the resultant parametrically amplified signal light S, is output externally. The pump light wavelength $\lambda_p$ is set such that it coincides with the zero-dispersion wavelength $\lambda_0$ of the nonlinear fiber 106 ($\lambda_p = \lambda_0$) as shown at the bottom of FIG. 7. In the figure, $\Delta\lambda$ denotes the distance (separation amount) between the signal light wavelength $\lambda_s$ and the pump light wavelength $\lambda_p$. In an optical parametric amplifier with such a construction, the following items can be given as factors that govern the generation of parametric gain.

(i) Factors originating from four wave mixing (ii) Factors originating from the walk-off between a signal light S and a pump light P Therefore, in order to realize parametric gain broadband, high parametric gain, it is necessary to consider the factors (i) and (ii) when producing a design.

To be specific, regarding the factors in (i), the four wave mixing generation efficiency and phase matching conditions are important. Four wave mixing efficiency $\eta_c$ is typically represented by the following equation (1).

$$\eta_c = [[1 - \exp(-\alpha z)]/\alpha]^2 \exp(-\alpha z)[\gamma P_p]^2 \quad (1)$$

Here, $\alpha$ denotes the absorption coefficient of a nonlinear fiber, $\gamma$ denotes the nonlinear coefficient, and $P_p$ denotes the optical power of the pump light pulse P. From the relationship in the above-described equation (1), in order to ensure the required four wave mixing efficiency, it is necessary to suppress the influence of the absorption coefficient $\alpha$, and increase the pump optical power $P_p$.

Furthermore, the phase matching condition $\Delta\beta$ is satisfied when the following equation (2) is satisfied, which is represented using a signal light wavelength $\lambda_s$, a pump light wavelength $\lambda_p$, the zero-dispersion wavelength $\lambda_0$ of the nonlinear fiber 106, and the dispersion slope $dD_c/d\lambda$.

$$\Delta\beta = -2\gamma P_p \quad (2)$$

$$\Delta\beta = -\frac{2\pi c \lambda_0^3}{\lambda_p^3 \lambda_s^2} \frac{dD_C}{d\lambda}(\lambda_P - \lambda_S)^2(\lambda_P - \lambda_0)$$

As described previously, in a typical optical parametric amplifier, a design is produced in which the zero-dispersion wavelength $\lambda_0$ of a nonlinear fiber and a pump light wavelength $\lambda_p$ coincide. However, since the zero-dispersion wavelength $\lambda_0$ of the nonlinear fiber actually used cannot avoid fluctuation in the longitudinal direction, it is difficult to realize the state of $\lambda_0=\lambda_p$ exactly. If the phase matching condition of equation (2) described above is satisfied in the state in which the pump light wavelength $\lambda_p$ is shifted relative to the zero-dispersion wavelength $\lambda_0$, the maximum parametric gain will be achieved at a specific wavelength. That is, the parametric gain in the ideal state of $\lambda_0=\lambda_p$ becomes constant relative to wavelength over a wide range, but a peak occurs in the bandwidth characteristic of the parametric gain actually obtained, due to the shift of the pump light wavelength $\lambda_p$ relative to the zero-dispersion wavelength $\lambda_0$. The occurrence of the peak limits the bandwidth of the optical parametric amplifier. Moreover, in order to amplify a desired signal light by a high gain, it is necessary to set the zero-dispersion wavelength $\lambda_0$ and the pump light wavelength $\lambda_p$ such that the peak wavelength of the parametric gain appears close to the signal light wavelength. However, this is not easy to realize due to the aforementioned fluctuations and the like of the zero-dispersion wavelength $\lambda_0$.

When the dispersion slope is zero ($dD_c/d\lambda=0$), the relationship of equation (2) is not satisfied, and hence phase mismatching always remains, causing a decrease in the gain.

Considering the relationship between equation (1) and equation (2), in order to realize high gain in an optical parametric amplifier, for example two wavelength excitation using pump lights of two wavelengths is effective. However, since an optical parametric amplifier using two wavelength excitation requires literally two pump light sources, there is a problem in that it has a cost disadvantage.

Regarding the factors in (ii) originating from walk-off, the walk-off (delay amount) $\Delta\tau$ between the signal light S and the pump light P is obtained from the following equation (3) using the length L of the nonlinear fiber.

$$\Delta\tau = \frac{dD_C}{d\lambda}(\lambda_P - \lambda_S)^2 L \quad (3)$$

Figure 8:
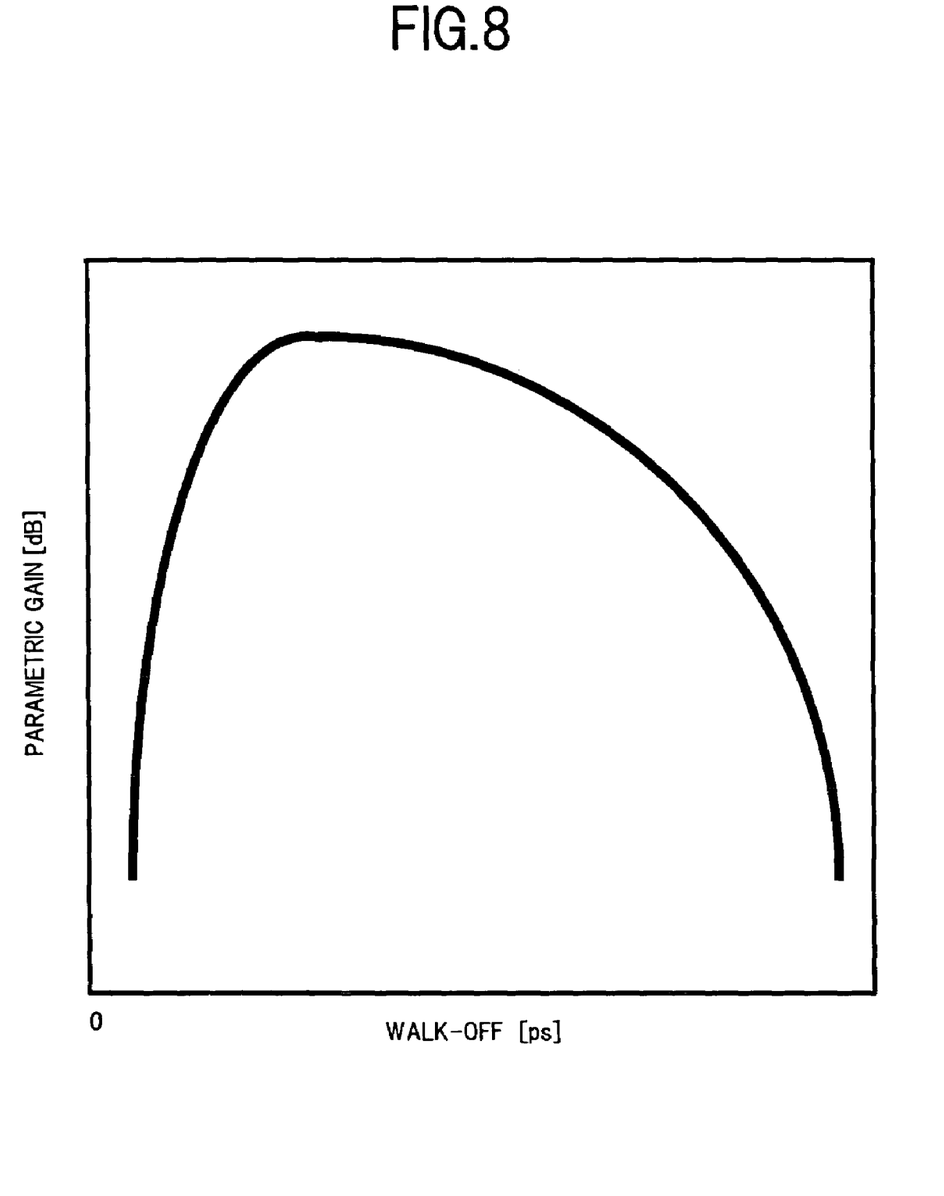
FIG. 8 is a diagram showing an example of the relationship between parametric gain, and walk-off of a signal light from a pump light.

FIG. 8 illustrates the relationship between the parametric gain and the walk-off $\Delta\tau$ between the signal light S and the pump light P. This relationship shows that when the walk-off $\Delta\tau$ reaches a certain value, the parametric gain reaches a maximum. The decrease in gain in the region where the walk-off $\Delta\tau$ is comparatively low, before the parametric gain reaches its maximum, indicates phase mismatching. On the other hand, the decrease in gain after the parametric gain reaches its maximum is caused by the walk-off $\Delta\tau$ between the signal light pulse S and the pump light pulse P increasing. In this manner, in parametric amplification, the walk-off $\Delta\tau$ between the signal light pulse S and the pump light pulse P, and the phase matching conditions $\Delta\beta$, are factors that have a great influence over the gain.

SUMMARY OF THE INVENTION

The present invention addresses the above-described points, with an object of providing an optical parametric amplifier that can realize high gain and broadband using a simple structure. Furthermore, an object is to provide an optical parametric amplifier that can amplify a signal light of a desired wavelength by high parametric gain.

In order to achieve the above-described objects, one aspect of an optical parametric amplifier according to the present invention is an optical parametric amplifier comprising a nonlinear amplification section to which a signal light is injected, and a pump light supply section which supplies pump light to the nonlinear amplification section, which parametrically amplifies signal light transmitted through the nonlinear amplification section by nonlinear optical effects due to the pump light, and outputs this, wherein the nonlinear amplification section is constructed by connecting in multiple stages a plurality of nonlinear amplification media having mutually different zero-dispersion wavelengths and dispersion slopes. In such an optical parametric amplifier, parametric gains with different wavelength characteristics are obtained in each of the multi-stage nonlinear amplification media, and the signal light is amplified parametrically in the gain bandwidth of the summed parametric gains.

Regarding the plurality of nonlinear amplification media of the optical parametric amplifier, it is preferable that each of their zero-dispersion wavelengths is on the short wavelength side from a wavelength of the pump light, and the zero-dispersion wavelengths of nonlinear amplification media that are relatively located on the signal light input side are on the long wavelength side from the zero-dispersion wavelengths of nonlinear amplification media that are relatively located on the signal light output side. Furthermore, it is desirable that dispersion slopes of nonlinear amplification media that are relatively located on the signal light output side are steeper than dispersion slopes of nonlinear amplification media that are relatively located on the signal light input side. Moreover, it is desirable to have high nonlinearity in which a range over which nonlinear optical effects can be obtained effectively is narrower than a range over which group velocity dispersion occurs. By using a plurality of nonlinear amplification media as described above, it is possible to obtain high parametric gain over a broad band from the vicinity of the pump light wavelength.

Another aspect of an optical parametric amplifier according to the present invention is an optical parametric amplifier comprising a nonlinear amplification medium to which a signal light is injected, and a pump light supply section which supplies pump light to the nonlinear amplification medium, which parametrically amplifies the signal light transmitted through the nonlinear amplification medium, by nonlinear optical effects due to the pump light, and outputs this, wherein the nonlinear amplification medium has a zero-dispersion wavelength that is different from a pump light wavelength, and also has a dispersion slope set such that a peak wavelength of parametric gain is located in the vicinity of a signal light wavelength. Such an optical parametric amplifier can obtain the highest parametric gain corresponding to the wavelength of a signal light.

According to the parametric amplifier of the present invention as described above, even in the case where the zero-dispersion wavelength of the nonlinear amplification medium does not coincide with the pump light wavelength, by optimizing the zero-dispersion wavelengths of the multi-stage nonlinear amplification media, and the dispersion slopes, it is possible to realize high gain and broadband for parametric amplification. Furthermore, it is possible to achieve high gain for parametric amplification without causing structural complexity, by designing the dispersion slopes of the nonlinear amplification media in consideration of the desired signal light wavelengths.

Other objects, features and advantages of the present invention will become apparent in the following description of embodiments, in conjunction with the appended drawings.

DETAILED DESCRIPTION OF THE INVENTION

Hereunder is a description of a best mode for carrying out the present invention, with reference to the appended drawings. Identical symbols denote identical or equivalent parts throughout all of the drawings.

Figure 1:
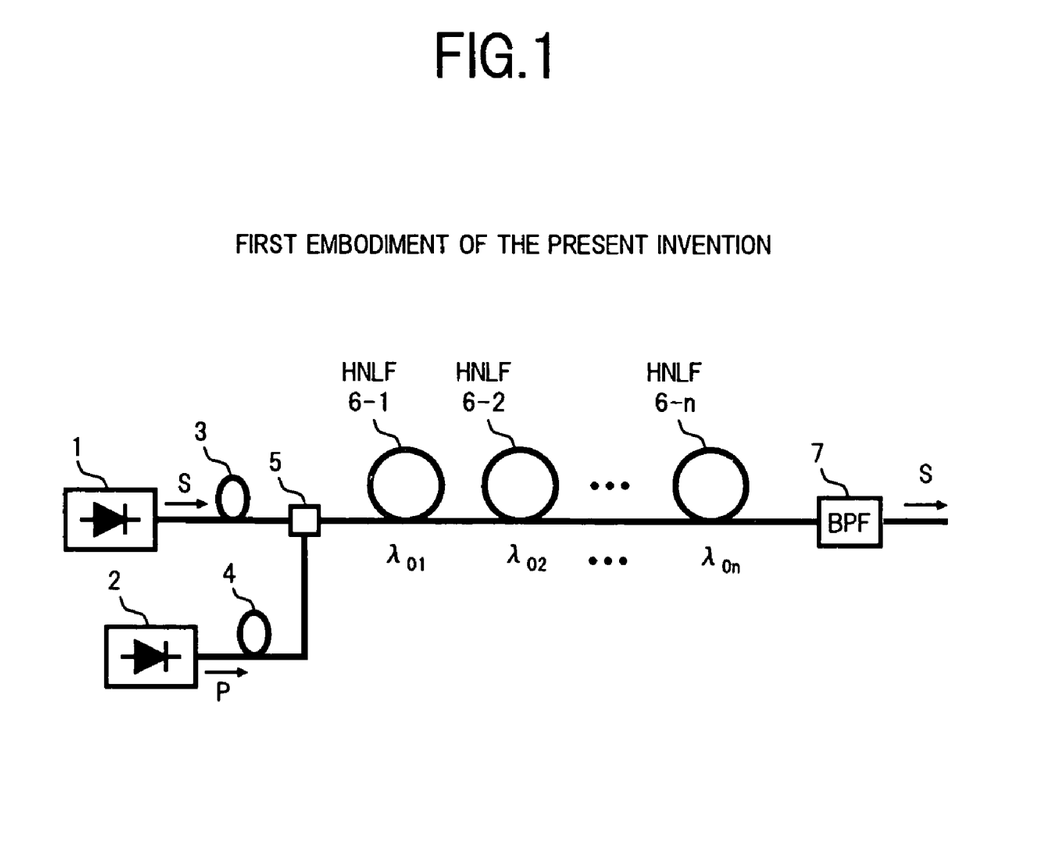
FIG. 1 is a diagram showing the structure of a first embodiment of an optical parametric amplifier according to the present invention.

FIG. 1 is a diagram showing the structure of a first embodiment of an optical parametric amplifier according to the present invention.

In FIG. 1, an optical parametric amplifier of the present embodiment comprises, for example: a signal light source 1 which generates a signal light S; a pump light source 2 which generates a pump light P; polarization controllers 3 and 4 serving as polarization control devices; a coupler 5 which combines the signal light S and the pump light P; n polarization retaining highly nonlinear optical fibers (hereunder referred to as HNLF) 6-1, 6-2, to 6-n, serving as a nonlinear amplifying section; and an optical bandpass filter 7 serving as a signal light extraction section.

The signal light source 1 generates a signal light pulse S with a high-speed bit rate, in accordance with the OTDM system for example, and outputs the signal light S to the polarization controller 3. Here, an example is shown in which the signal light source 1 is provided in the optical parametric amplifier. However, the present invention is not limited to this, and the arrangement may be such that a signal light transmitted through optical transmission paths and the like of various optical communication systems is input to the optical parametric amplifier.

The pump light source 2, for which a typical continuous light source or a pulse light source is used, generates a pump light P having a wavelength $\lambda p$ and an optical power Pp, which are set in advance with consideration given to the signal light wavelengths, and zero-dispersion wavelengths of each of the HNLFs 6-1 to 6-n, and outputs the pump light P to the polarization controller 4.

The polarization controllers 3 and 4 convert the signal light S from the signal light source 1, and the pump light P from the pump light source 2, respectively, into linearly polarized lights, and variably control each of the polarization directions, so that the signal light S and the pump light P have the same polarizations in the input section of the HNLF 6-1. Here, the polarization controllers 3 and 4 are arranged corresponding to both the signal light S and the pump light P. However, one polarization controller may be provided for either one of the signal light S and the pump light P to control the relative polarization directions.

The coupler 5 combines the signal light S and the pump light P output from the polarization controllers 3 and 4, and supplies the combined light to the HNLF 6-1.

The HNLFs 6-1 to 6-n are connected in series between the output terminal of the coupler 5 and the input terminal of the optical bandpass filter 7, and each of their zero-dispersion wavelengths and their dispersion slopes are set to mutually different values. Each of the HNLFs 6-1 to 6-n has higher nonlinearity than a nonlinear fiber used in a typical parametric amplifier, and the range (nonlinear range) over which the nonlinear optical effects can be obtained effectively is sufficiently shorter than the range (dispersion range) over which group velocity dispersion occurs. Using such HNLFs as nonlinear amplification media enables nonlinear amplification media with short lengths to be achieved. Here, an example is shown in which HNLFs are used. However, the nonlinear amplification media applicable to the present invention are not limited to these, and for example nonlinear optical crystals or the like may be used. If it is possible to select appropriate zero-dispersion wavelengths and dispersion slopes, the shape and the like of the media are not critical.

Figure 2:
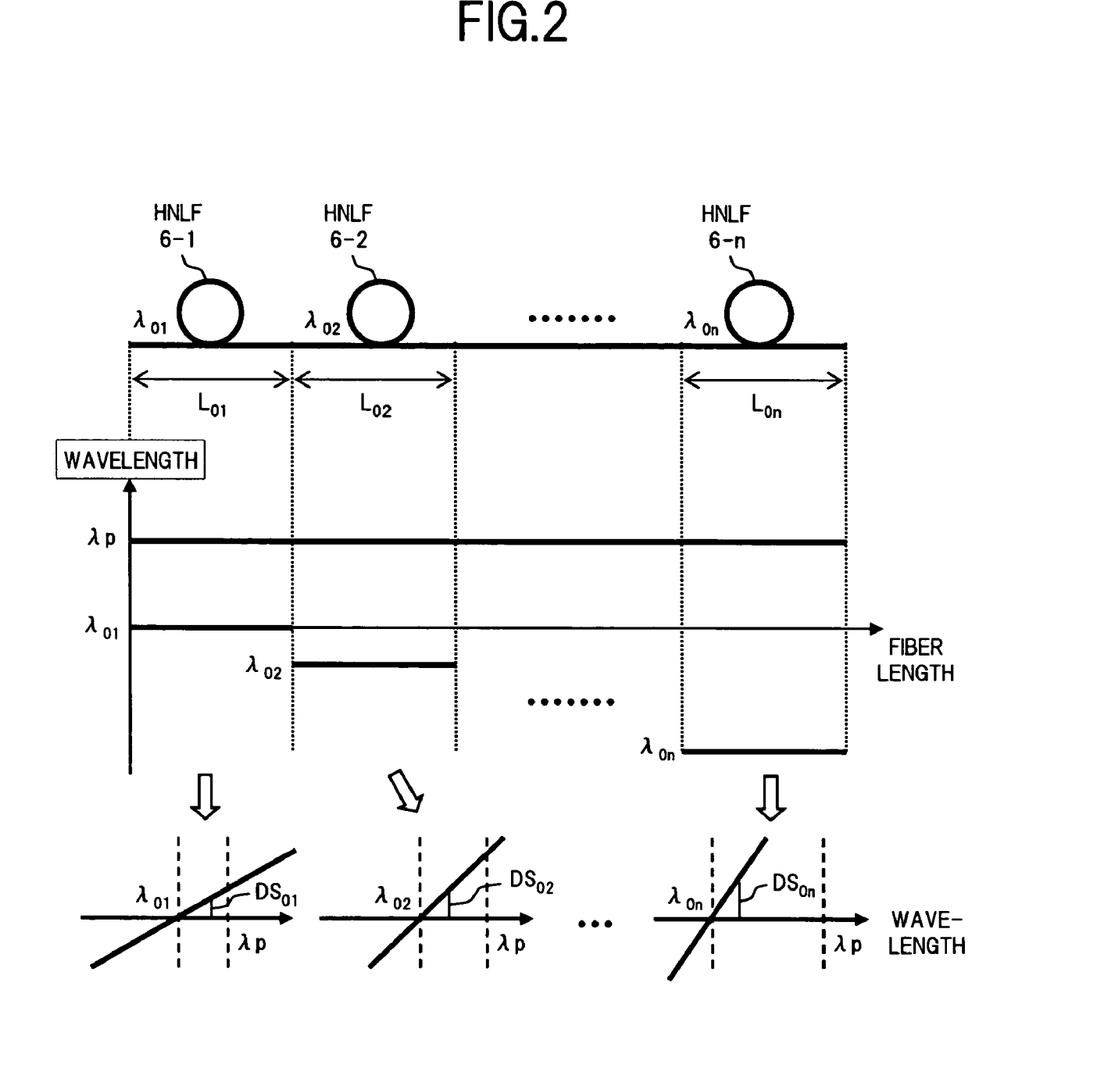
FIG. 2 is a diagram to explain the relationship between the zero-dispersion wavelengths and dispersion slopes of multi-stage HNLFs in the first embodiment.

Here is a detailed description of the relative relationship of the zero-dispersion wavelengths and the dispersion slopes of each of the HNLFs 6-1 to 6-n with reference to FIG. 2. Hereunder, the zero-dispersion wavelengths of the HNLFs 6-1 to 6-n are designated $\lambda_{01}$ to $\lambda_{0n}$, the dispersion slopes are designated $DS_{01}$ to $DS_{0n}$, and the fiber lengths are designated $L_{01}$ to $L_{0n}$. The dispersion slope $dDc/d\lambda$ in the above-described equation (2) corresponds to the dispersion slopes $DS_{01}$ to $DS_{0n}$.

The middle of FIG. 2 shows the relative relationship between the zero-dispersion wavelengths $\lambda_{01}$ to $\lambda_{0n}$ of the HNLFs 6-1 to 6-n and the pump light wavelength $\lambda_p$, where the horizontal axis is fiber length, and the vertical axis is wavelength. In this manner, it is set such that the zero-dispersion wavelengths $\lambda_{01}$, to $\lambda_{0n}$ of the multi-stage HNLFs 6-1 to 6-n are shorter towards the later stages of the HNLFs, satisfying the relative relationship $\lambda_{01} > \lambda_{02} > \ldots > \lambda_{0n}$. The zero-dispersion wavelength $\lambda_{01}$ of the first stage HNLF 6-1 is positioned on the shorter wavelength side to the pump light wavelength $\lambda_p$ ($\lambda_p > \lambda_{01}$).

Furthermore, the bottom of FIG. 2 shows the relative relationship between the dispersion slopes $DS_{01}$ to $DS_{0n}$ of each of the HNLFs 6-1 to 6-n. In this manner, the arrangement is set such that the dispersion slopes $DS_{01}$ to $DS_{0n}$ of the multi-stage HNLFs 6-1 to 6-n are steeper towards the later stages of the HNLFs, satisfying the relative relationship $DS_{01} < DS_{02} < \ldots < DS_{0n}$.

FIG. 2 shows an example in which the fiber lengths $L_{01}$ to $L_{0n}$ of the respective HNLFs 6-1 to 6-n are almost the same. However, the lengths of the nonlinear amplification media in the present invention can be adjusted appropriately according to the desired parametric gain bandwidth characteristics.

The optical bandpass filter 7 has a pass band corresponding to the signal light wavelength. It extracts the signal light component from the light passing through each of the HNLFs 6-1 to 6-n, and outputs it externally as a signal light S after parametric amplification.

Next is a description of the operation of the first embodiment.

In an optical parametric amplifier with the above-described construction, the signal light S from the signal light source 1, and the pump light P from the pump light source 2 are combined in the same polarization state via the polarization controllers 3 and 4, and the coupler 5, and sent to the input terminal of the HNLF 6-1. The signal light S and the pump light P supplied to the HNLF 6-1 are transmitted to the multi stage HNLFs 6-1 to 6-n in sequence, and the signal light S is parametrically amplified by nonlinear optical effects due to the pump light P in each of the HNLFs 6-1 to 6-n.

At this time, since it is set such that the zero-dispersion wavelengths $\lambda_{01}$ to $\lambda_{0n}$ of the multi stage HNLFs 6-1 to 6-n become shorter towards the later stages of the HNLFs, and the dispersion slopes $DS_{01}$ to $DS_{0n}$ become steeper towards the later stages of the HNLFs, the peak wavelengths of the parametric gains in each of the HNLFs 6-1 to 6-n are shifted towards the pump light wavelength side (long wavelength side) in sequence. Therefore, the parametric gain obtained over all of the multi stage HNLFs 6-1 to 6-n is a high gain over a broad band.

To be specific, as mentioned above, if a shift occurs between the zero-dispersion wavelength $\lambda_0$ and the pump light wavelength $\lambda_p$ of the nonlinear amplification medium in the parametric amplification, a peak occurs in the wavelength characteristics of the parametric gain. In the phase matching condition $\Delta\beta$ shown in the aforementioned equation (2), in the case where the value of $2\gamma P_p$ is constant, if the shift of the zero-dispersion wavelength $\lambda_0$ relative to the pump light wavelength $\lambda_p$ becomes large, increasing the value $(\lambda_p-\lambda_0)$, then by the increase being compensated by the decrease of $(\lambda_p-\lambda_s)$, the phase matching condition is satisfied. That is, the signal light wavelength $\lambda_s$, which can obtain peak gain by the increase in the shift of the zero-dispersion wavelength $\lambda_0$, is shifted towards the long wavelength side, and approaches the pump light wavelength $\lambda_p$. Therefore, in the present optical parametric amplifier, attention is given to the relationship between the aforementioned shift of the zero-dispersion wavelength $\lambda_0$ relative to the pump light wavelength $\lambda_p$, and the peak wavelength of the parametric gain, and it is set such that the zero-dispersion wavelengths $\lambda_{01}$ to $\lambda_{0n}$ of the HNLFs 6-1 to 6-n are separated from the pump light wavelength $\lambda_p$ towards the later stages of the HNLFs, and are shifted towards the short wavelength side. As a result the peak wavelengths of the parametric gains in each of the HNLFs 6-1 to 6-n approach the pump light wavelength $\lambda_p$ towards the later stages of the HNLFs.

Figure 3:
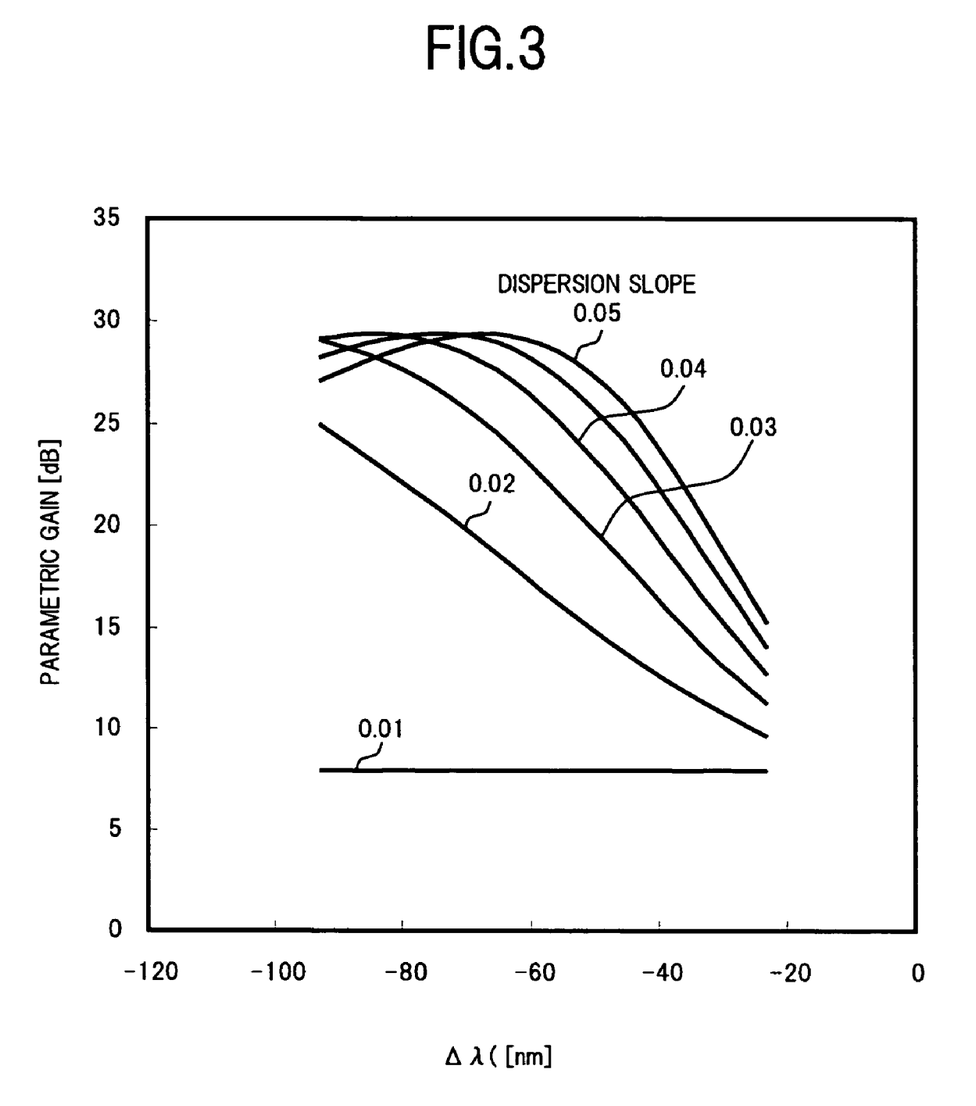
FIG. 3 is a diagram showing the relationship between the parametric gain bandwidth characteristics and dispersion slopes of nonlinear amplification media.

Furthermore, since the peak wavelength of parametric gain also depends on the dispersion slope, the present optical parametric amplifier utilizes this characteristic positively to achieve parametric gain broadband and high parametric gain. FIG. 3 shows the relationship between the parametric gain bandwidth characteristics (to be specific, the characteristics of parametric gain with respect to the separation amount $\Delta\lambda$ of the signal light wavelength $\lambda_s$ from the pump light wavelength $\lambda_p$), and the dispersion slopes of the nonlinear amplification media. In this manner, the peak wavelengths of the parametric gain bandwidth characteristics are shifted towards the long wavelength side by the increase of the dispersion slopes, approaching the pump light wavelength $\lambda_p$. Such characteristics correspond to the fact that in the phase matching condition $\Delta\beta$ shown in the aforementioned equation (2), in the case where the value of $2\gamma P_p$ is constant, the phase matching condition is satisfied by the increase of the dispersion slope $dDc/d\lambda$ being compensated by the decrease of $(\lambda_p-\lambda_s)$. Therefore, in the present optical parametric amplifier, it is set such that the dispersion slopes $DS_{01}$ to $DS_{0n}$ of the HNLFs 6-1 to 6-n become steeper towards the later stages of the HNLFs. As a result the peak wavelengths of the parametric gains in each of the HNLFs 6-1 to 6-n approach the pump light wavelength $\lambda_p$ towards the later stages of the HNLFs.

Figure 4:
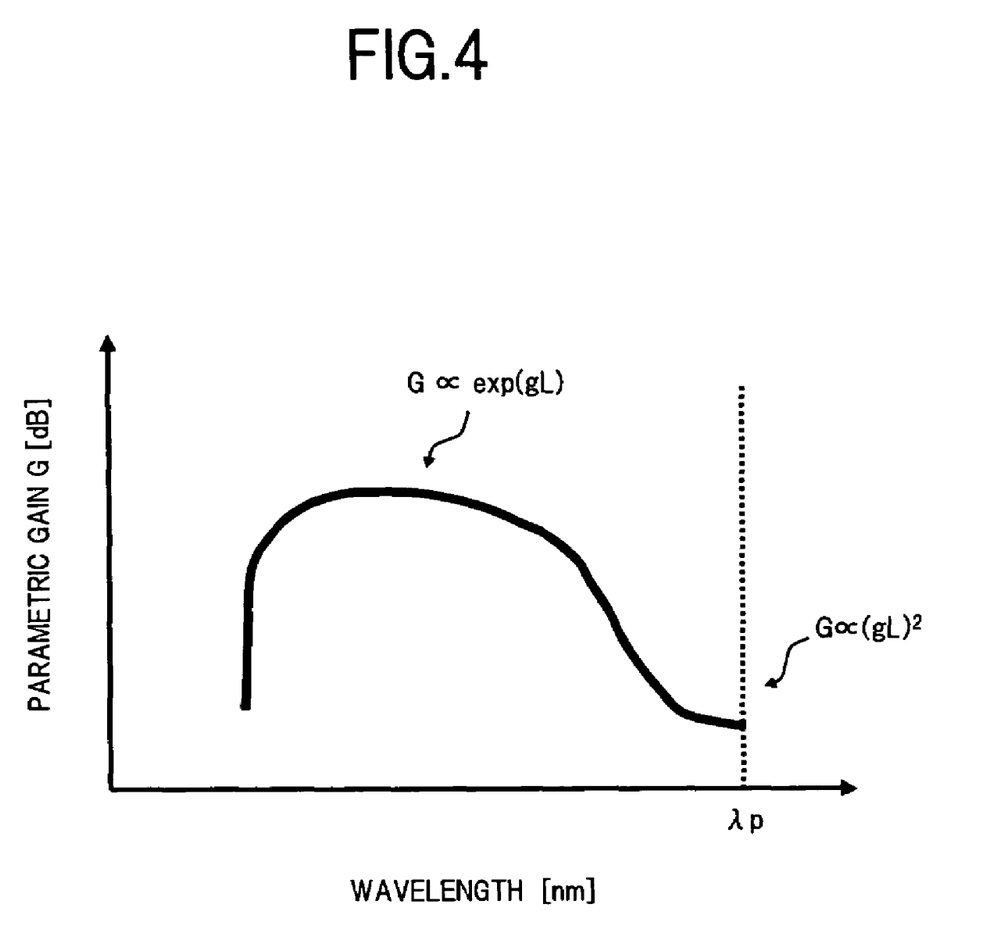
FIG. 4 is a diagram showing, schematically, the wavelength characteristics of parametric gain of a single HNLF.

FIG. 4 is a diagram showing, schematically, the relationship between the wavelength and the parametric gain in one HNLF among the multi stage HNLFs 6-1 to 6-n. The increasing characteristic of the parametric gain in a single HNLF is determined by the relative positions of the pump light wavelength $\lambda_p$, the zero-dispersion wavelength $\lambda_0$, and the signal light wavelength $\lambda_s$. As shown in FIG. 4, in the wavelength region close to the pump light wavelength $\lambda_p$, the parametric gain G is proportional to the fiber length L squared ($G \propto (gL)^2$), and in the wavelength region that is away from the pump light wavelength $\lambda_p$ and in which the phase matching condition is satisfied completely, the parametric gain G increases as an exponential function of the fiber length L ($G \propto \exp(gL)$). The present optical parametric amplifier aims at producing a high gain of the parametric gain by utilizing the difference in the increase of parametric gain relative to the wavelength.

Figure 5:
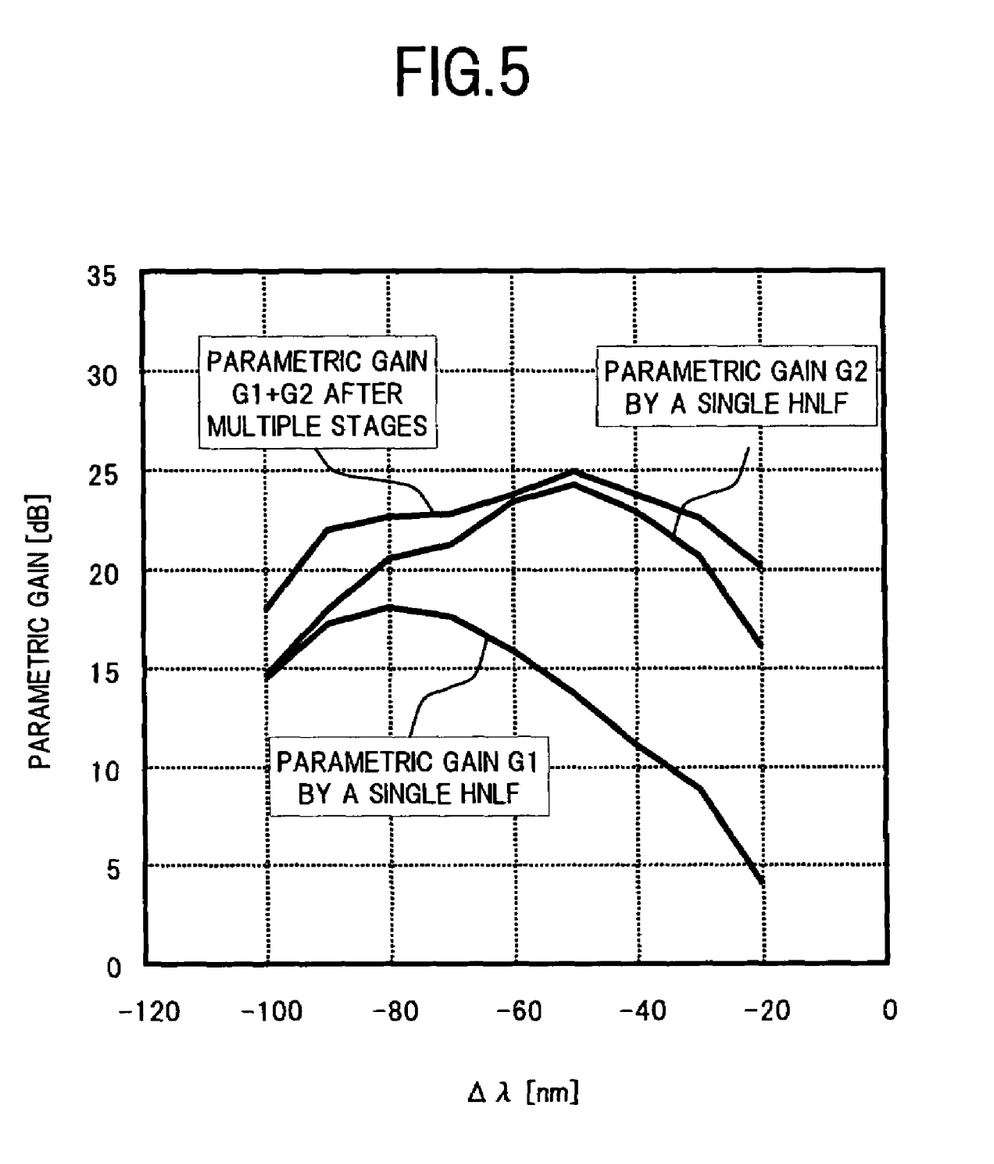
FIG. 5 is a diagram showing an example of the wavelength characteristics of parametric gain when two HNLFs are multi-staged.

FIG. 5 shows an example of the wavelength characteristics of parametric gain obtained when two HNLFs, whose zero-dispersion wavelengths and dispersion slopes are mutually different, are connected and multi staged. The parametric gain G1 due to a single HNLF corresponds to the HNLF on the earlier stage side, where the zero-dispersion wavelength is close to the pump light wavelength $\lambda_p$. The parametric gain G2 due to a single HNLF corresponds to the HNLF on the later stage side, where the zero-dispersion wavelength is separated from the pump light wavelength $\lambda_p$. Moreover, the parametric gain obtained after the multiple stages is the sum of the gains G1 and G2, and a wavelength characteristic is realized that is flatter than for a single HNLF. In the present optical parametric amplifier, n HNLFs are multi staged as described above, and hence a high parametric gain can be obtained over a broad band from the vicinity of the pump light wavelength $\lambda_p$.

By optimization of the zero-dispersion wavelengths $\lambda_{01}$ to $\lambda_{0n}$ and the dispersion slopes $DS_{01}$ to $DS_{0n}$ in the above multi stage HNLFs 6-1 to 6-n, then in the present optical parametric amplifier, the phase matching condition is optimized towards the later stage side of the HNLFs 6-1 to 6-n, and deterioration of the signal light pulse due to rapid increase of power due to the nonlinear effects on the earlier stage side is suppressed, thus enabling high gain to be obtained towards the later stages.

In addition, in the present optical parametric amplifier, using HNLFs as nonlinear amplification media aims to shorten the fiber length. As a result, the walk-off $\Delta\tau$ between the signal light S and the pump light P, as shown in the aforementioned equation (3), is suppressed, and the effect of group velocity dispersion (GVD) from the HNLFs is also suppressed, thus enabling even higher gain of the optical parametric amplifier.

As described above, according to an optical parametric amplifier of the first embodiment, HNLFs 6-1 to 6-n are used as nonlinear amplification media, connected in series for multi staging, and the setting of the zero-dispersion wavelengths $\lambda_{01}$ to $\lambda_{0n}$ and the dispersion slopes $DS_{01}$ to $DS_{0n}$ of the HNLFs 6-1 to 6-n is optimized. As a result it is possible to realize high gain and broadband parametric amplification by using even a simple construction in which one pump light source 2 is used.

Next is a description of a second embodiment of the present invention.

Figure 6:
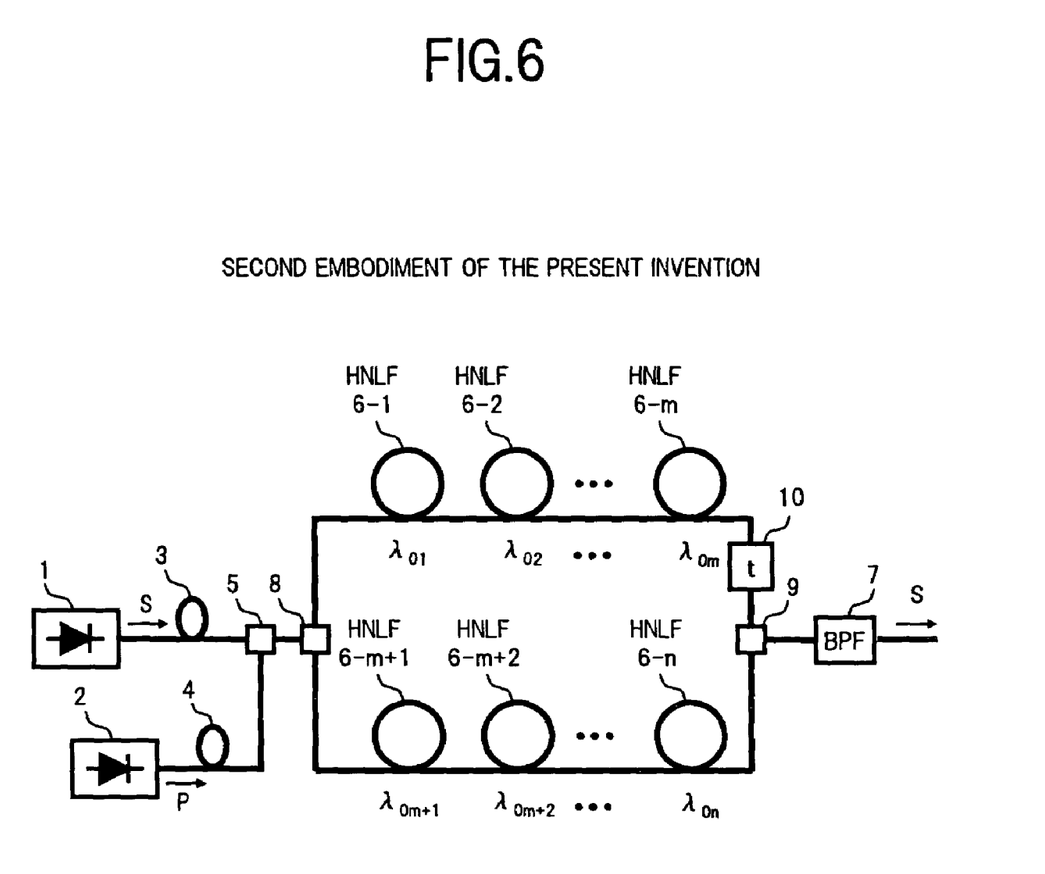
FIG. 6 is a diagram showing the structure of a second embodiment of an optical parametric amplifier according to the present invention.

FIG. 6 is a diagram showing the structure of a second embodiment of an optical parametric amplifier according to the present invention.

In FIG. 6, an optical parametric amplifier of the present embodiment comprises n multi stage HNLFs 6-1 to 6-n, wherein m (1<m<n) HNLFs 6-1 to 6-m from among the n HNLFs 6-1 to 6-n in the structure of the first embodiment shown in FIG. 1 are connected in series, n-m HNLFs 6-m+1 to 6-n are connected in series, and the HNLFs 6-1 to 6-m and the HNLFs 6-m+1 to 6-n are connected in parallel by a coupler 8 and a coupler 9. The arrangement is set such that the zero-dispersion wavelengths $\lambda_0$ to $\lambda_{0m}$ and $\lambda_{0m+1}$ to $\lambda_{0n}$ of the HNLFs 6-1 to 6-m and 6-m+1 to 6-n become shorter towards the later stages of the HNLFs similarly to the case of the first embodiment, and there are relative relationships of $\lambda_{01} > \lambda_{02} > \ldots \lambda_{0m}$ and $\lambda_{0m+1} > \lambda_{0m+2} \ldots > \lambda_{0n}$. Furthermore, the arrangement is set such that the dispersion slopes $DS_{01}$ to $DS_{0m}$ and $DS_{0m+1}$ to $DS_{0n}$ of the HNLFs 6-1 to 6-m and 6-m+1 to 6-n also become steeper towards the later stages of the HNLFs similarly to the case of the first embodiment, and there are relative relationships of $DS_{01} < DS_{02} < \ldots < DS_{0m}$ and $DS_{0m+1} < DS_{0m+2} < \ldots < DS_{0n}$.

Moreover, the present optical parametric amplifier has a delay adding device 10 between the HNLF 6-m and the coupler 9. The delay adding device 10 adjusts the time difference occurring between the signal light S transmitted through the HNLFs 6-1 to 6-m, and the signal light S transmitted through the HNLFs 6-m+1 to 6-n.

In an optical parametric amplifier with the above-described construction, the signal light S from the signal light source 1, and the pump light P from the pump light source 2 are combined in the same polarization state via the polarization controllers 3 and 4, and the coupler 5. Furthermore, the combined light is branched into two by a branching device 8, and one branched light is transmitted to the HNLF 6-1, and the other branched light is transmitted to the HNLF 6-m+1. The signal light S and the pump light P supplied to the HNLF 6-1 are transmitted in sequence through the HNLFs 6-1 to 6-m connected in series, and according to the same principle of operation as in the case of the first embodiment, the signal light S is parametrically amplified by nonlinear optical effects due to the pump light P in the HNLFs 6-1 to 6-m. Similarly, the signal light S and the pump light P supplied to the HNLF 6-m+1 are transmitted in sequence through the HNLFs 6-m+1 to 6-n connected in series, and parametrically amplified. Moreover, a required time delay is added to the signal light S parametrically amplified in the HNLFs 6-1 to 6-m by the delay adding device 10, which corrects the time difference with respect to the signal light S parametrically amplified in the HNLFs 6-m+1 to 6-n. Then, the output lights from the delay addition device 10 and the HNLF 6-n are combined by the coupler 9, supplied to the optical bandpass filter 7, and the signal light component contained in the combined light is extracted. As a result the parametrically amplified signal light S is output from the optical bandpass filter 7 externally.

As described above, using the optical parametric amplifier of the second embodiment, it is also possible to obtain the same effects as in the case of the first embodiment.

In the first and second embodiments, structural examples are shown in which multi-stage HNLFs are used to realize an optical parametric amplifier that is both high gain and broadband at the same time. However, in an optical parametric amplifier in which a single nonlinear fiber is used as shown for example in FIG. 7, by applying the dispersion slope dependency of the peak wavelength of parametric gain as shown in FIG. 3, and setting the dispersion slopes of the nonlinear fiber in consideration of the desired signal light wavelength, it is possible to locate the peak wavelength of the parametric gain in the vicinity of the signal light wavelength. Therefore, it is also possible to realize high gain without structural complexity, by optimal design of the dispersion slope in an optical parametric amplifier in which a single nonlinear fiber is used.

The invention claimed is:

1. An optical parametric amplifier comprising a nonlinear amplification section to which a signal light is injected, and a pump light supply section which supplies pump light to said nonlinear amplification section, which parametrically amplifies the signal light transmitted through said nonlinear amplification section, by nonlinear optical effects due to the pump light, and outputs the amplified signal light, wherein said nonlinear amplification section is constructed by connecting in multiple stages a plurality of nonlinear amplification media having mutually different zero-dispersion wavelengths and dispersion slopes.

2. An optical parametric amplifier according to claim 1, wherein for said plurality of nonlinear amplification media, each of their zero-dispersion wavelengths is on the short wavelength side from a wavelength of the pump light, and the zero-dispersion wavelengths of the nonlinear amplification media that are relatively located on a signal light input side are on the long wavelength side from the zero-dispersion wavelengths of the nonlinear amplification media that are relatively located on a signal light output side.

3. An optical parametric amplifier according to claim 1, wherein for said plurality of nonlinear amplification media, the dispersion slopes of the nonlinear amplification media that are relatively located on a signal light output side are steeper than the dispersion slopes of the nonlinear amplification media that are relatively located on a signal light input side.

4. An optical parametric amplifier according to claim 1, wherein said plurality of nonlinear amplification media have a high nonlinearity in which a distance over which the nonlinear optical effects can be obtained effectively is narrower than a distance over which a group velocity dispersion occurs.

5. An optical parametric amplifier according to claim 4, wherein said plurality of nonlinear amplification media use a polarization retaining highly nonlinear optical fiber.

6. An optical parametric amplifier according to claim 1, wherein said plurality of nonlinear amplification media are connected in series.

7. An optical parametric amplifier according to claim 1, wherein said plurality of nonlinear amplification media are connected in parallel.

8. An optical parametric amplifier according to claim 1, wherein said pump light supply section comprises:

a pump light source which generates a pump light;

a polarization control device which controls at least one of a polarization condition of signal light, and a polarization condition of pump light output from said pump light source, so that polarization directions of signal light and pump light in a signal light input end of said nonlinear amplification section become the same; and a coupler which combines a signal light and a pump light for which the polarization condition is controlled by said polarization control device, and supplies this to said nonlinear amplification section.

9. An optical parametric amplifier according to claim 1, comprising a signal light extraction section which extracts a signal light component from light which has passed through said nonlinear amplification section.

* * * * *